US010484488B2

(12) United States Patent
Muench

(10) Patent No.: US 10,484,488 B2
(45) Date of Patent: Nov. 19, 2019

(54) METHOD FOR DYNAMIC AND AUTOMATIC CREATION OF USER INTERFACES

(71) Applicant: C-Labs Corporation, Bellevue, WA (US)

(72) Inventor: Chris Muench, Bellevue, WA (US)

(73) Assignee: C-Labs Corporation, Bellevue, WA (US)

(*) Notice: Subject to any disclaimer, the term of this patent is extended or adjusted under 35 U.S.C. 154(b) by 0 days.

(21) Appl. No.: 14/949,512

(22) Filed: Nov. 23, 2015

(65) Prior Publication Data

US 2016/0147402 A1    May 26, 2016

Related U.S. Application Data

(60) Provisional application No. 62/083,625, filed on Nov. 24, 2014.

(51) Int. Cl.
    *H04L 29/08*    (2006.01)
    *G06F 3/0481*   (2013.01)
(52) U.S. Cl.
    CPC .......... *H04L 67/22* (2013.01); *G06F 3/04817* (2013.01); *H04L 67/02* (2013.01);
    (Continued)
(58) Field of Classification Search
    CPC . H04L 12/2818; H04L 12/2809; H04L 67/02; H04L 67/10; H04L 67/12;
    (Continued)

(56) References Cited

U.S. PATENT DOCUMENTS 7,269,795 B2    9/2007  Whittenberger
2002/0125998 A1* 9/2002 Petite .................... G01D 4/004
                                                      340/286.01
(Continued)

FOREIGN PATENT DOCUMENTS

EP    2744152 A2    6/2014
JP    2007018303 A    1/2007
(Continued)

OTHER PUBLICATIONS

International Search Report and Written Opinion for PCT Application No. PCT/US2015/062196, Applicant: C-Labs Corporation, dated Mar. 4, 2016, 10 pages.

(Continued)

*Primary Examiner* — Aaron Lowenberger
(74) *Attorney, Agent, or Firm* — Perkins Coie LLP

(57) ABSTRACT

Technology is disclosed for dynamically creating a user interface for interacting with various devices of multiple communication clusters. The technology enables a communication between a mobile apparatus and a first device in a communication cluster and transmits a publication request, from the first device, to a second device in the same communication cluster. The method receives a publication reply from the second device and then generates consolidated information based on the publication reply. The consolidated information includes control instructions for interacting with the first and second devices. The consolidated information is transmitted to the mobile apparatus. The method then creates a user interface based on the consolidated information. The user interface enables a user of the mobile apparatus to directly interact with the first and second devices in the communication cluster.

20 Claims, 5 Drawing Sheets

(52) U.S. Cl.
CPC .............. *H04L 67/10* (2013.01); *H04L 67/12* (2013.01); *H04L 67/2809* (2013.01); *H04L 67/34* (2013.01)

(58) Field of Classification Search
CPC ..... H04L 67/22; H04L 67/34; H04L 67/2809; G06F 3/0484; G06F 3/04847; G06F 3/04817; G06F 3/04812
See application file for complete search history.

(56) References Cited

U.S. PATENT DOCUMENTS

| | | | |
|---|---|---|---|
| 2006/0143295 A1* | 6/2006 | Costa-Requena | ............................ H04L 63/0428 709/227 |
| 2008/0313531 A1* | 12/2008 | Song | .................... H04L 12/2803 715/234 |
| 2010/0274859 A1* | 10/2010 | Bucuk | ...................... H04L 63/08 709/206 |
| 2012/0016976 A1 | 1/2012 | Voellmann et al. | |
| 2012/0229660 A1 | 9/2012 | Matthews et al. | |
| 2013/0268654 A1* | 10/2013 | Abraham | ............ H04W 40/246 709/224 |
| 2014/0181703 A1 | 6/2014 | Sullivan et al. | |
| 2014/0244001 A1 | 8/2014 | Glickfield et al. | |
| 2014/0244768 A1 | 8/2014 | Shuman et al. | |
| 2014/0244834 A1 | 8/2014 | Guedalia et al. | |
| 2015/0319006 A1* | 11/2015 | Plummer | ............. H04L 12/2827 700/83 |
| 2015/0319046 A1* | 11/2015 | Plummer | ............. H04L 12/2807 715/736 |

FOREIGN PATENT DOCUMENTS

| | | |
|---|---|---|
| JP | 2010041344 A | 3/2012 |
| JP | 2012109742 A | 6/2012 |
| WO | 2016085878 A1 | 6/2016 |

OTHER PUBLICATIONS

Extended European Search Report for European Application No. 15864237.1, filed Nov. 23, 2015, Applicant: C-Labs Corporation, dated Nov. 23, 2017, 9 pages.
English Translation of Japanese Office Action for Japanese Application No. 2017-535087, Applicant: C-Labs Corporation, dated Sep. 29, 2017, 10 pages.
English Translation of Chinese Office Action for Chinese Application No. 201580074331.2, Applicant: C-Labs corporation, dated Feb. 5, 2018, 15 pages.
English Translation of Japanese Office Action for Japanese Application No. 2017-535087, Applicant: C-Labs Corporation, dated Sep. 6, 2018, 4 pages.
English Translation of Chinese Office Action for Chinese Application No. 201580074331.2, Applicant: C-Labs Corporation, dated Sep. 27, 2018, 15 pages.

* cited by examiner

METHOD FOR DYNAMIC AND AUTOMATIC CREATION OF USER INTERFACES

CROSS-REFERENCE TO RELATED APPLICATIONS

This application claims the benefit of U.S. Provisional Application No. 62/083,625, filed Nov. 24, 2014 and entitled "METHOD FOR DYNAMIC AND AUTOMATIC CREATION OF USER INTERFACES," the contents of which are hereby incorporated by reference in its entirety.

BACKGROUND

As a modern trend, more and more electronic devices are capable of communicating or interacting with one another via a network. For example, the Internet of Things ("IoT") provides a network for devices with uniquely embedded identifiers to communicate with one another based on the infrastructure of the Internet. Traditionally, however, interaction or communication with devices in the IoT requires customized user interfaces or software specifically programmed or configured for each device in the IoT.

Creation of required customized user interfaces or software can be extremely costly and time-consuming. In addition, in an event that a device is discovered, added to, or removed from an IoT system, the customized user interfaces or software needs to be updated or changed accordingly, which may result in interruptions of the system's normal operation. Therefore, it is advantageous to have an improved method or system that can dynamically create suitable user interfaces for interacting or communicating with each device in a network system without, or at least with minimum, interruptions.

BRIEF DESCRIPTION OF THE DRAWINGS

Embodiments of the disclosed technology will be described and explained through the use of the accompanying drawings.

Figure 1:
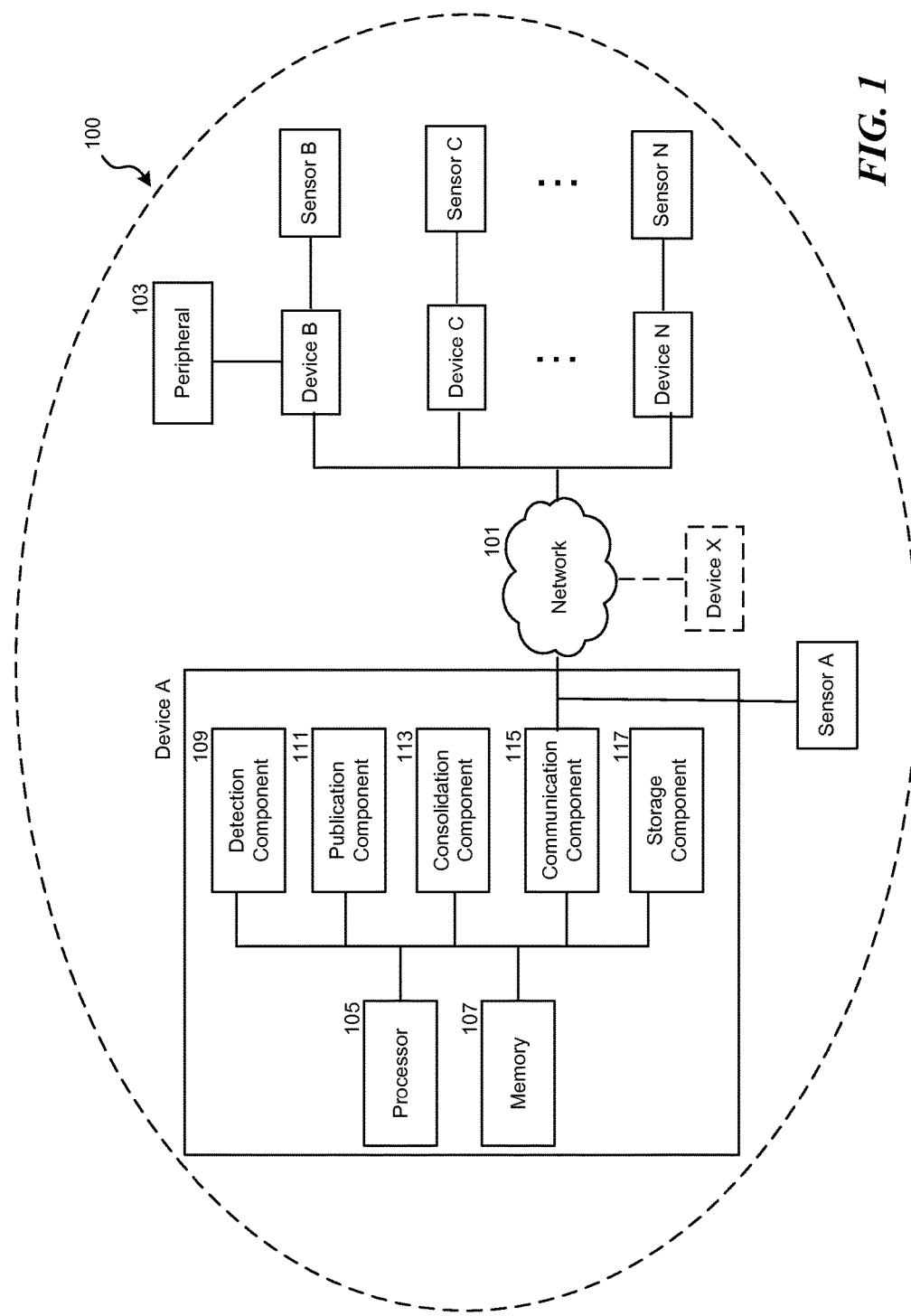
FIG. 1 is a schematic diagram illustrating a communication cluster in accordance with embodiments of the disclosed technology. Multiple devices in the communication cluster are also illustrated.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "an embodiment", "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

A communication cluster can be defined as a group of devices, sensors, machines, or other suitable means that can communicate or interact with one another via any suitable means. For example, a communication cluster in a coffee shop can include multiple devices, such as a personal computer operated by a store sales clerk, a printer, a television, a cashier machine, an air conditioner with temperature and humidity sensors, various notebooks used by store customers, a wireless access point, etc. The communication cluster can be determined based on proximity (e.g. physical locations) of its devices. The devices thereof can be connected with one another via a wired or wireless network (e.g., via WiFi™, infrared, Bluetooth™, or other suitable communication protocols). In some embodiments, the devices thereof can be connected with one another via a secured/private or unsecured/public network. In some embodiments, the communication cluster can be determined on virtual addresses (e.g., Internet Protocol (IP) address).

Traditionally, when a device is discovered, added to, or removed from a communication cluster (e.g., multiple devices in an office) or a network (e.g., a corporate intranet), device-specific (or interface-specific) programming or configuration is necessary to generate a proper user interface to interact with such device. Similar situations happen when the status of a device in a communication cluster or a network has been modified (e.g., changes of properties, parameters, or other settings).

The present disclosure provides methods and systems for dynamically creating user interfaces for interacting with multiple devices in a communication cluster or a network based on currently available information from each device without requiring further programming or configuration (e.g., without shutting down and restarting each device in the communication cluster for updating user interfaces). User interfaces described in the present disclosure can be used to interact with a user based on various user actions, such as gestures, touches, finger movements, movements of pointing devices, voices, etc.

The system in the present disclosure enables a user of a user terminal (e.g., a mobile or portable apparatus) that is connected with a communication cluster or a network to readily interact with multiple devices thereof without unnecessary interruption. In some embodiments, the user terminal can be a smartphone, a tablet, a phablet, a kiosk, or other suitable device that include proper software (e.g., a browser) or user interfaces for interacting with users. In some embodiments, the system described in the present disclosure can first detect a user terminal when it is within the range of a network utilized by a communication cluster. The system can then establish a communication between the user terminal and one of the devices in the communication cluster. The device that communicates with the user terminal can then transmit a publication request to each device in the communication cluster, seeking device-specific information to interact with each device.

For example, when a customer with a smartphone walks into a coffee shop, one of the devices in the coffee shop (e.g., a wireless access point) first detects the existence of the customer's smartphone and then establishes a communication with the customer's smartphone (e.g., via a suitable wireless connection protocol). The device connected with the customer's smartphone can further transmit a publication request to each device in the coffee shop for device-specific metadata which can include user interface information or suitable parameters for interacting with each device.

In one example, the device-specific metadata can include how the customer's smartphone can control the television to switch channels. In another example, the device-specific metadata can include how the customer's smartphone can operate the printer in the coffee shop. As another example, the device-specific metadata can include information regarding how the customer's smartphone can receive temperature and humidity information from the temperature and humidity sensors of the air conditioner in the coffee shop.

In some embodiments, the device-specific metadata can include not only information for creating user interfaces for specific devices but also information regarding how a user should interact with the user interfaces. For example, the device-specific metadata can include information regarding how to create a positive user experience (e.g., a combination of a user interface and a user interaction).

In response to the publication request, each device in the communication cluster then returns a publication reply including corresponding device-specific metadata back to the device that communicates with the user terminal. The device that communicates with the user terminal further consolidates the returned publication replies to form consolidated information. Finally, the device that communicates with the user terminal then transmits the consolidated information to the user terminal. The system of the present disclosure can generate a user interface at the user terminal based on the consolidated information. The consolidated information can include information (e.g., device-specific metadata) regarding how the user terminal can interact with each of the devices in the communication cluster. In some embodiments, the consolidated information can also include control instructions that are specific to devices and executable by the user terminal. For example, the consolidated information can include an executable control instruction that links with a specific device (e.g., including a device-specific identification or an identifier associated with that device). The executable control instruction enables a user of the user terminal to interact with a device by a single user action. For example, the system can present multiple (virtual) buttons or other interaction mechanisms in a user interface (e.g., FIG. 5 and corresponding descriptions). The user interface provides easy and convenient access to each device in the communication cluster without requiring device-specific programming or configuration.

In the same coffee shop example described above, in response to a publication request sent by the wireless access point, each of the devices (e.g., can include the wireless access point itself, in some embodiments) in the coffee shop returns a publication reply to the wireless access point, providing device-specific user interface information or other suitable parameters for interacting therewith. The wireless access point then generates consolidated information based on returned publication replies and transmits the consolidated information to the customer's smartphone. The customer's smartphone can establish a proper user interface based on the consolidated information. The generated user interface enables the customer to interact with each device in the coffee shop by his/her smartphone (e.g., turn on or off the television, adjust a target room temperature for the air conditioner, print a document by the printer, etc.), without requiring device-specific programming or configuration.

In some embodiments, the system of the present disclosure can establish a communication between a user terminal and a device in a remote communication cluster via a local relay or a cloud relay. The local relay or cloud relay is used to relay information to a user terminal from a remote communication cluster that is not directly connected or communicated to the user terminal. In some embodiments, the local relay or cloud relay can be used to first relay information from a remote communication cluster to a device in a local communication cluster (e.g., in proximity to a user terminal), and then that device can further transmit the relayed information to the user terminal connected with that device.

For example, the system can establish a communication between a customer's tablet with devices (e.g., a parking payment machine or a security camera) in a parking garage located a few blocks away via a relay (e.g., a local relay or a cloud relay). In this example, the system enables the customer to access the payment machine remotely (e.g., pay a parking ticket before heading to the parking garage) and the customer can access the security camera in the parking garage so as to check on his/her car parked therein without using a separate application or opening a separate browser page.

In some embodiments, devices in a communication cluster include devices that are continuously coupled to other devices in the communication cluster (e.g., via a wired or wireless connection) and devices that are loosely-coupled thereto. The loosely-coupled devices include those that intermittently connect with other devices or those that connect with other devices in irregular time intervals. Examples of the loosely-coupled devices include moveable objects (e.g., a pager/smartphone carried by a doctor in a hospital), autonomous devices (e.g., an automatic vacuum cleaner in a house), vehicles (e.g., vehicles moving across a security gate or a border), etc.

In some embodiments, the system can include a "fault-tolerant" component to determine which device should be included in a communication cluster based on various factors. For example, the fault-tolerant component can determine to include some devices (e.g., smartphones in an office) staying in a certain area for more than a certain period of time (e.g., 5 hours per day) to be included in a communication cluster (e.g., categorize these smartphones into a full-time employee cluster in the office).

Another aspect of the present disclosure is that the system can create, manage, and deliver information regarding user experience of all discovered and connected devices (including intermittently connected ones) to a user terminal that connects with one of the devices in the system. The fact that a user can interact, monitor, or control each device in the system through a user terminal empowers the user terminal as a backup or redundant control mechanism of the system in cases the original control mechanism fails. For example, a control panel on an air conditioner in a coffee shop may fail and thus a user cannot control the air conditioner thereby. With the disclosed system, the user is able to control the air conditioner by his/her smartphone as a backup control mechanism.

FIG. 1 is a schematic diagram illustrating a communication cluster 100 in accordance with embodiments of the disclosed technology. In some embodiments, the communication cluster 100 can include a group of devices that are in close proximity (e.g., in a store, an office, a building, etc.). In other embodiments, the communication cluster 100 can include a group of devices connected via a network (e.g., a corporate intranet). As shown in FIG. 1, the communication cluster 100 includes multiple devices communicated via a network 101. Examples of the device include a desktop computer, a server computer, a machine, an appliance, a piece of equipment, a portable device such as a smartphone, a tablet, a phablet, a notebook, or other suitable device that are coupleable via a network. The multiple devices can include constantly-coupled devices A-N and a loosely-coupled device X. In other embodiments, the communication cluster 100 can have different numbers of constantly-coupled devices and loosely-coupled devices. The constantly-coupled devices A-N are coupled or connected with one another via the network 101. The loosely-coupled device X is intermittently connected with other devices in the communication cluster 100 or connected with other devices in the communication cluster 100 in irregular time intervals.

Referring to FIG. 1, the communication cluster 100 can also include sensors A-N coupled to the devices A-N, respectively. In some embodiments, the sensors A-N can include a temperature sensor, a humidity sensor, a pressure sensor, a movement sensor, an audio sensor, a light sensor, or other suitable sensors. In some embodiments, one device can be coupled to more than one sensor. For example, the device can be an air conditioner coupled to temperature, humidity, and motion sensors.

As shown in FIG. 1, the communication cluster 100 can include a peripheral 103 coupled to the device B. In other embodiments, the communication cluster 100 can have more than two peripherals 103 coupled to suitable devices therein. In some embodiments, the peripheral 103 can be a component or unit that is used to store or exchange (e.g., input or output) information with a device in communication cluster 100 that it is coupled to. Examples of the peripheral 103 can include a pointing device, a keyboard, a monitor, a printer, a hard drive, a fresh drive, etc. In some embodiments, the peripheral 103 can be coupled to a loosely-coupled device in the communication cluster 100, such as the device X.

In the illustrated embodiment, the device A can include a processor 105, a memory 107, a detection component 109, a publication component 111, a consolidation component 113, a communication component 115, and a storage component 117. In some embodiments, the devices B-N and X in the communication cluster 100 can have components and configuration similar to the device A. The processor 105 is configured to control the memory 107 and the components (e.g., 109, 111, 113, 115, and 117) in the device A. The memory 107 is coupled to the processor 105 and configured to store instructions for controlling the components in the device A. The communication component 115 is configured to communicate with other devices via the network 101.

The detection component 109 is configured to detect an event that a user terminal or mobile apparatus (not shown in FIG. 1) enters into the range of the network 101. For example, the network 101 can be a wireless network in a firm and the device A can be a desktop computer in a reception area of the firm. In this example, the detection component 109 can detect whether a firm visitor carries a mobile apparatus that can be connected with devices of the firm's network (e.g., by receiving suitable signals or requests from the mobile apparatus). Once a proper user terminal or mobile apparatus is detected, the device A continues to establish a communication with the detected mobile apparatus. In some embodiments, the communication between the detected mobile apparatus and the device A (or the communication cluster 100) can be established via a direct wired or wireless connection (e.g., via a Bluetooth™ or infrared communication). After establishing the communication, the device A can provide suitable information (e.g., device-specific user interface information; to be discussed below in detail), enabling the detected mobile apparatus to interact with the devices A-N and X in the communication cluster 100.

The publication component 111 of the device A is configured to sending or transmitting a publication request to all devices (in some embodiments, including the device A) in the communication cluster 100 via the communication component 115. In some embodiments, the publication request can include asking for an updated list of the devices in the communication cluster 100 (e.g., whether a device functions properly or whether there is any new device in or a device removed from the communication cluster 100). The device A then receives a publication reply from each device that receives the publication request via the communication component 115.

After receiving the publication reply, the consolidation component 113 is configured to form consolidated information. In some embodiments, the consolidated information can include information regarding how a user terminal or mobile apparatus can interact with a device in the communication cluster 100 (e.g., how a user terminal or mobile apparatus can interact with the sensor B and/or the peripheral 103 coupled to the device B). In some embodiments, the consolidated information can include device-specific user interface information (e.g., what user interfaces a user terminal or mobile apparatus should use to interact with the sensor B and/or the peripheral 103 coupled to the device B).

In some embodiments, the consolidated information can include a control instruction associated with a specific device identification corresponding to a specific device. When the control instruction is implemented or executed at the user terminal or the mobile apparatus, a user of the user terminal or mobile apparatus can directly control or interact with the device via the control instruction, without requiring further programming or configuration (e.g., without shutting down and restarting each device in the communication cluster 100 or the user terminal or mobile apparatus for updating user interfaces). In some embodiments, the consolidated information can be used to generate a user interface presented or displayed at the user terminal or mobile apparatus that communicates with the device A, so as to enable a user to interact with each of the devices (and the sensors/peripherals coupled thereto) in a convenient way.

The storage component 117 can be configured to store information of the device A, such as the consolidated information. For example, when the consolidation component 113 determines that a current version of the consolidated information is up-to-date (e.g., no newly-added or recently-removed devices), it can transmit the stored consolidated information to a user terminal without generating new consolidated information. In some embodiments, the storage component 117 can be configured to store a device list which includes most-current device information. In some embodiments, the device list can be maintained or updated periodically.

Figure 2:
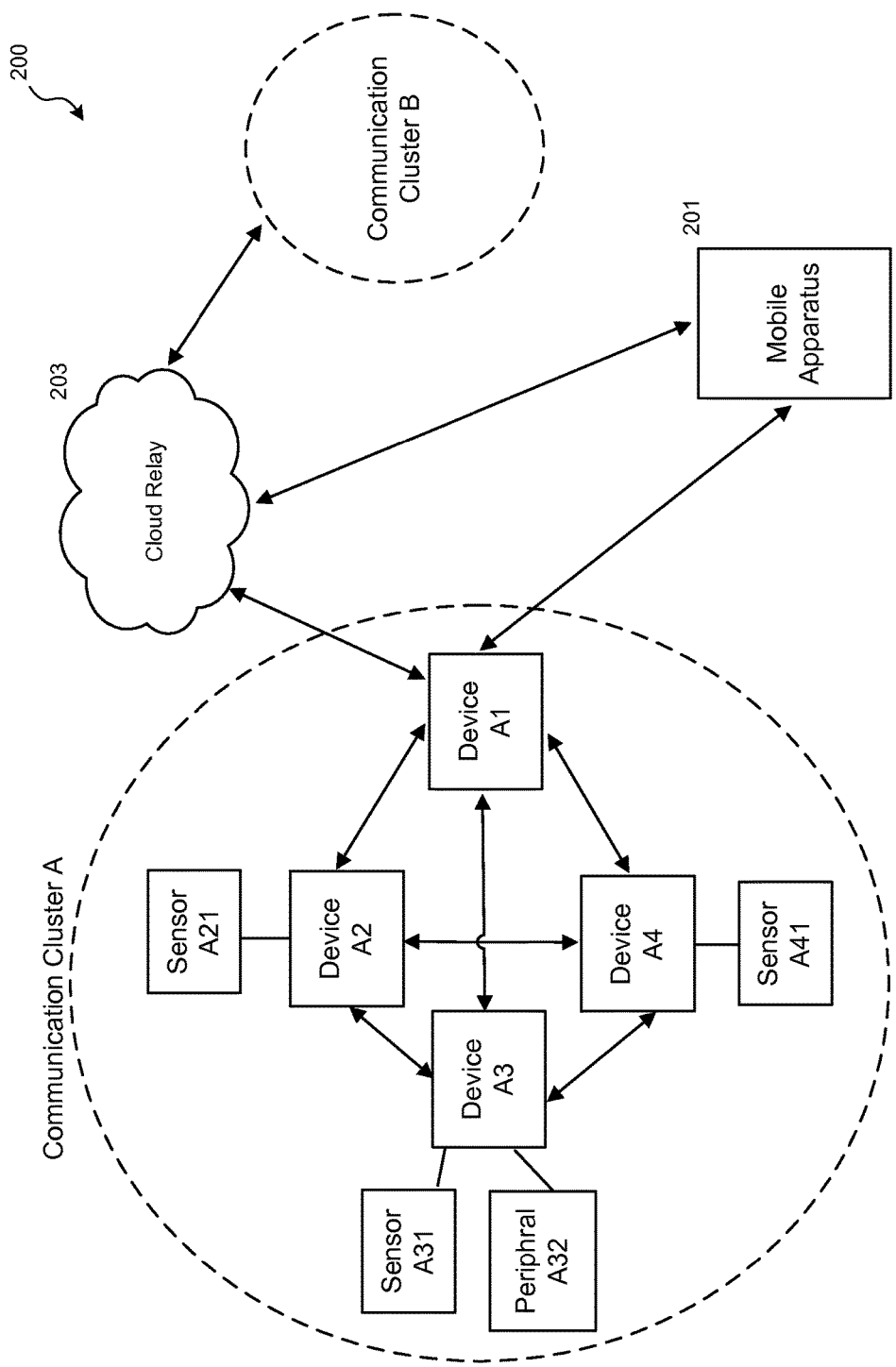
FIG. 2 is a schematic diagram illustrating a system that enables a mobile apparatus to interact with various devices in multiple communication clusters in accordance with embodiments of the disclosed technology.

FIG. 2 is a schematic diagram illustrating a system 200 that enables a mobile apparatus 201 to interact with various devices in multiple communication clusters in accordance with embodiments of the disclosed technology. Referring to FIG. 2, the system 200 includes communication clusters A, B, and a cloud relay 203. The communication cluster A is physically close to the mobile apparatus 201, and the communication cluster B is located remotely to the mobile apparatus 201. In some embodiments, the cloud relay 203 can be configured to store (and/or relay) information received from the communication clusters A and B (e.g., consolidated information, lists of devices, physical/virtual locations of devices, etc.).

As shown in FIG. 2, the communication cluster A can include devices A1-A4 directly coupled to one another (e.g., not via a network). The communication cluster A can include sensors A21, A31, and A41 coupled to the devices A2, A3, and A4, respectively. The communication cluster A also includes a peripheral A32 coupled to the device A3. Examples of the devices, sensors, and peripherals can be found at the descriptions in connection with FIG. 1 above. In other embodiments, the communication cluster A can have different numbers of devices, sensors, and peripherals.

In the illustrated embodiment, the mobile apparatus 201 can communicate with the devices A1-A4, sensors A21, A31, A41, and peripheral A32 via the device A1. The device A1 plays a role to the communication cluster A1 similar to the role that the device A plays for the communication cluster 100 discussed with reference to FIG. 1 above. For example, the device A1 can detect the existence of the mobile apparatus 201 when it is within the detection scope of device A1. In some embodiments, the mobile device 201 can notify the device A1 of its existence (e.g., by simply connecting to the device A1 through a wired or wireless connection). The device A1 can then establish a communication with the mobile apparatus 201. The device A1 then collects (e.g., by sending publication requests and receiving publication replies) and consolidates information regarding how the mobile device 21 can interact with each of the devices A1-A4 (and the sensors A21, A31, A41 and the peripheral A32) in the communication cluster A. In some embodiments, the consolidated information can include device-specific user interface information. In some embodiments, the consolidated information can include a control instruction corresponding to a specific device. When the control instruction is implemented or executed at the mobile apparatus 201, a user can directly control or interact with the device via the control instruction, without requiring further programming or configuration.

In some embodiments, the mobile apparatus 201 can communicate with the device A1 via the cloud relay 203. In some embodiments, the cloud relay 203 can be a server connected to a network (such as the Internet). The cloud relay 203 can further communicate with the communication cluster B via the network. The system 200 enables the mobile apparatus 201 to interact with any devices, sensors, or peripherals in the communication cluster B in similar ways that the mobile apparatus 201 interacts with the devices A1-A4, the sensors A21, A31, A41, and the peripheral A32 in the communication cluster A. In some embodiments, through the cloud relay 203, the mobile apparatus 201 can further interact with devices in other communication clusters (not shown in FIG. 2).

As an example, the mobile apparatus 201 can be a notebook carried by an employee of a corporation Y, the communication cluster A can be an office of the corporation Y located in America, and the communication cluster B can be a manufacturing site located in Asia. When the employee travels to the office, the notebook is detected and connected with a personal computer in the office. The personal computer sends consolidated information to the notebook and an integrated user interface is generated at the notebook. This arrangement enables the employee to have access to various devices in the office and the manufacturing site (e.g., through a cloud relay) without further programming or configuration.

In some embodiments, the system 200 can include a security mechanism to make sure that the mobile apparatus 201 can only access information in accordance with a specific security clearance level. For example, an employee may not have access to a database storing confidential information but can have access to a printer. As another example, a coffee store customer may not have access to a cashier machine but can have access to a wireless access point.

Figure 3:
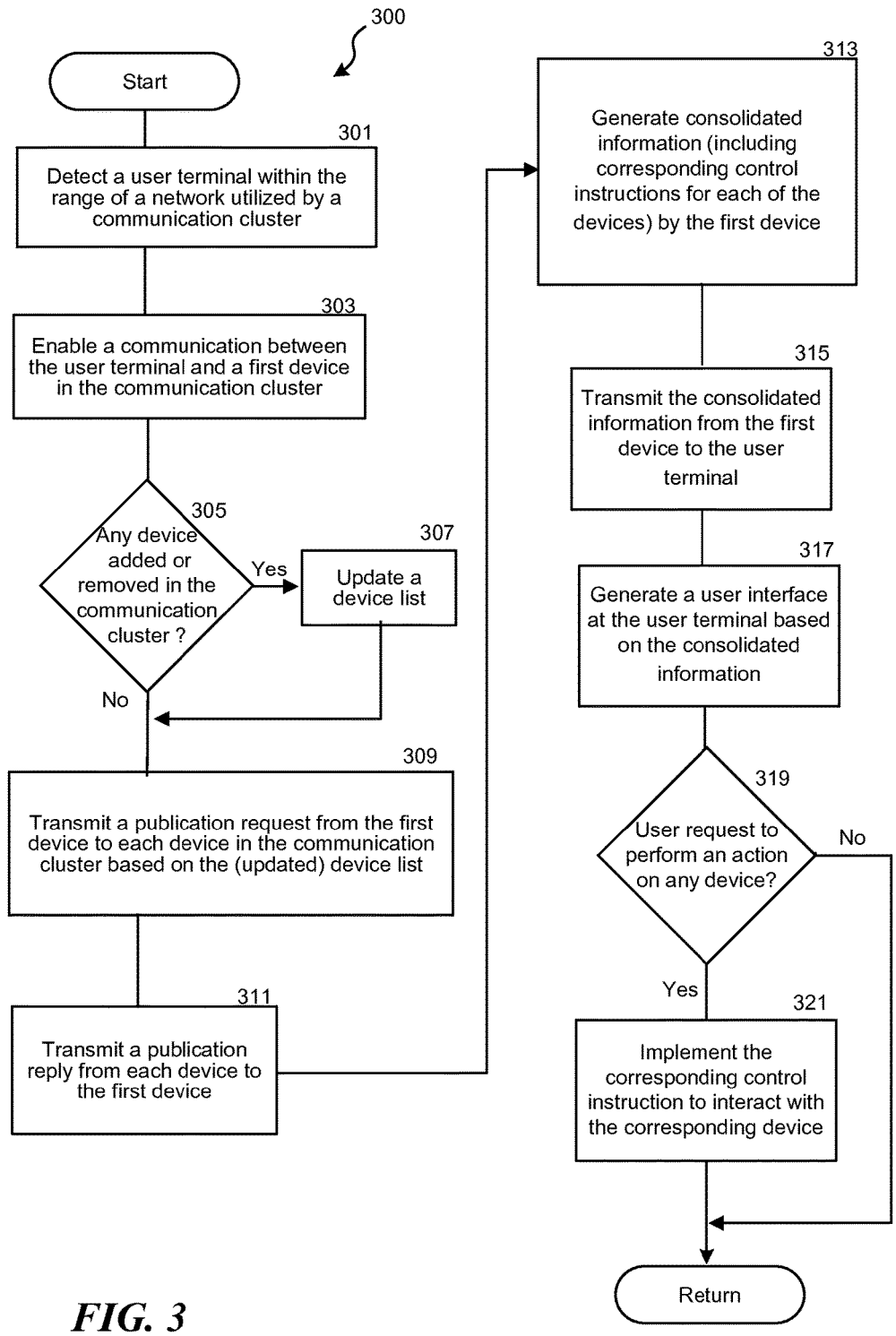
FIG. 3 is a flow chart illustrating operations of a method in accordance with embodiments of the disclosed technology.

FIG. 3 is a flow chart illustrating operations of a method 300 in accordance with embodiments of the disclosed technology. The method 300 can be implemented by an associated system (such as the system 200 discussed above). At block 301, the system detects the existence of a user terminal to see if it is within the range of a network that is utilized by a communication cluster. In response to the detection, the method 300 continues to block 303 and the system enables a communication between the user terminal and a first device in the communication cluster. In some embodiments, the first device can be determined based on physical locations (e.g., the one closest to the user terminal). In other embodiments, the first device can be pre-selected by a system operator (e.g., the one in a reception area). The method 300 then moves to a decision block 305 to determine whether there are any changes of devices that require an update of an existing device list. If so, the system updates the device list at block 307. If not, the method 300 moves to block 309.

At block 309, the system transmits a publication request from the first device to each device in the communication cluster based on the (updated or original) device list. At block 311, each of the devices in the communication cluster transmits a publication reply to the first device. The publication reply includes information regarding how to interact with that device (and sensors/peripherals coupled thereto). In some embodiments, the publication reply can include a control instruction that enables a user to directly interact with each of the devices (or sensors/peripherals coupled thereto) by simply implementing the control instruction.

At block 313, the first device then generates consolidated information based on the received publication replies. At block 315, the system then transmits the consolidated information from the first device to the user terminal. At block 317, the system can generate a user interface at the user terminal based on the consolidated information. The method 300 then moves to a decision block 319 to determine whether a user of the user terminal has requested (e.g., by pressing a virtual button on the user interface) to perform an action on any device (e.g., turn on a security camera connected to a security device) in the communication cluster. If not, then the method 300 returns. If so, the system then implements the corresponding control instruction to perform that action. The action is performed without requiring a further programming or configuration process.

Figure 4:
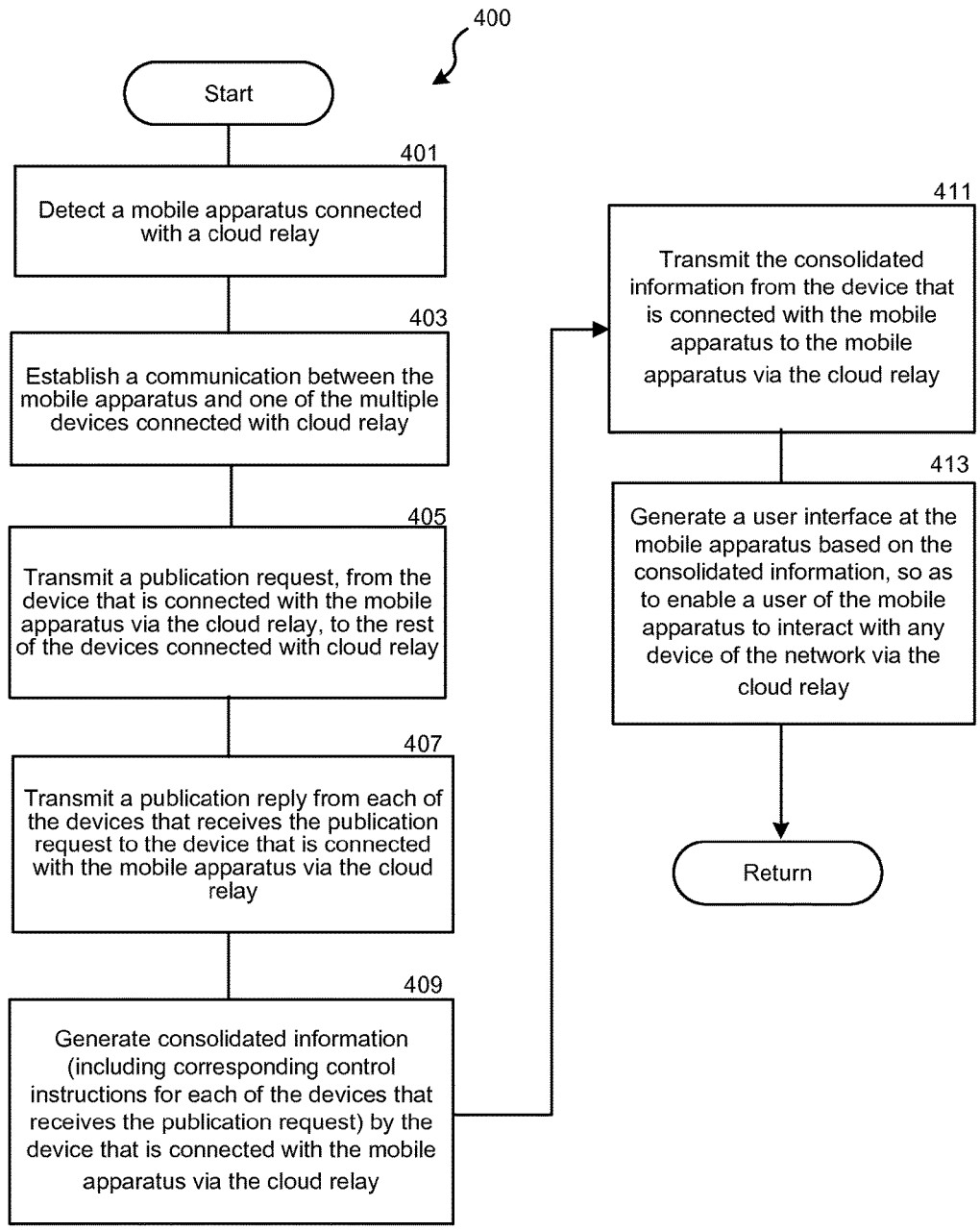
FIG. 4 is a flow chart illustrating operations of a method in accordance with embodiments of the disclosed technology.

FIG. 4 is a flow chart illustrating operations of a method 400 in accordance with embodiments of the disclosed technology. The method 400 can be implemented by an associated system (such as the system 200 discussed above). At block 401, the system detects an event that a mobile apparatus is connected with a cloud relay. At block 403, the system then establishes a communication between the mobile apparatus and one of the multiple devices connected with the cloud relay (e.g., via one or more networks, directly or indirectly). At block 405, the system transits a publication request, from the device that is connected with the mobile apparatus via the cloud relay, to the rest of the devices connected with the cloud relay.

At block 407, the system then transmits a publication reply, from each of the devices that receives the publication request, to the device that is connected with the mobile apparatus via the cloud relay. At block 409, the device that is connected with the mobile apparatus via the cloud relay, generates consolidated information based on the received publication replies. The consolidated information can include corresponding control instructions for each of the devices that receive the publication request. At block 411, the device that is connected with the mobile apparatus via the cloud relay transmits the consolidated information to the mobile apparatus through the cloud relay. The system then generates a user interface at the mobile apparatus based on the consolidated information, so as to enable a user of the mobile apparatus to interact with any device that is (e.g., directly or indirectly) connected with the cloud relay. The method 400 then returns.

Figure 5:
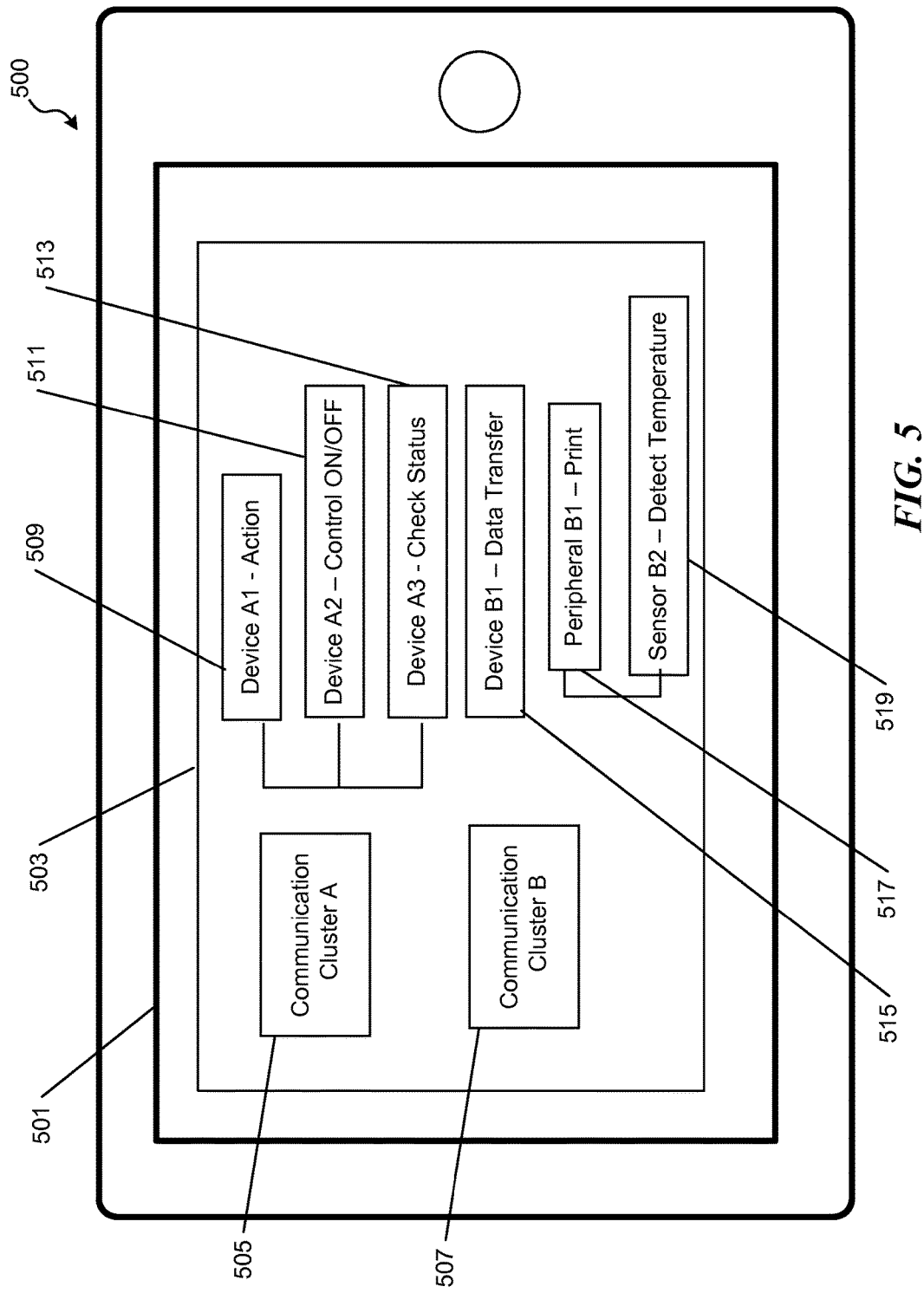
FIG. 5 is a schematic diagram illustrating a user interface in accordance with embodiments of the disclosed technology.

FIG. 5 is a schematic diagram illustrating a user interface 503 in accordance with embodiments of the disclosed technology. As shown in FIG. 5, a mobile apparatus 500 can include a display 501, on which the user interface 503 can be formed. The user interface 503 can include a first area 505 indicating that a communication cluster A is connected with the mobile apparatus 500 and a second area 507 indicating that a communication cluster B is connected with the mobile apparatus 500. On the right hand side of the first area 505 and the second area 507, a first virtual button 509, a second virtual button 511, a third virtual button 513, a fourth virtual button 515, a fifth virtual button 517, and a sixth virtual button 519 are displayed.

In the illustrated embodiment, the first virtual button 509 is indicative of an action that a user of the mobile apparatus 500 can perform on a device A1 of the communication cluster A. For example, the user can click the first virtual button 509 to perform the action shown on the first virtual button 509. The second virtual button 511 is indicative of a control instruction that a user of the mobile apparatus 500 can perform on a device A2 of the communication cluster A. For example, the user can turn on or off the device A2 by simply clicking the second virtual button 511. The third virtual button 513 is indicative of a status check request that a user of the mobile apparatus 500 can perform on a device A3 of the communication cluster A. For example, the user can check whether a security gate functions normally by simply clicking the third virtual button 513.

In the illustrated embodiment, the fourth virtual button 515 is indicative of a data transfer request that a user of the mobile apparatus 500 can perform on a device B1 (e.g., a personal computer) of the communication cluster B. For example, the user can request to download a file recorded by the device B1 by clicking the fourth virtual button 515. The fifth virtual button 517 is indicative of an instruction that a user of the mobile apparatus 500 can perform on a peripheral B1 (e.g., a printer) coupled to the device B1 of the communication cluster B. The sixth virtual button 519 is indicative of a detecting request that a user of the mobile apparatus 500 can perform on a sensor B2 (e.g., a temperature sensor measuring a CPU temperature) coupled to the device B1 of the communication cluster B.

In some embodiments, the user interface 503 can include one or more sliders, scroll bars, or other suitable components for user interaction. In some embodiments, a user can interact with the user interface 503 by palm or finger movements. In some embodiments, further information of devices can be displayed in the user interface 503. For example, an indication (not shown in FIG. 5) next to the first virtual button can display a physical location of the device A1 (e.g., 2nd floor of a building).

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method of dynamically generating user interfaces at a user terminal apparatus, comprising:

determining the user terminal apparatus is within a range of a network utilized by multiple devices in a communication cluster;

enabling a communication between the user terminal apparatus and a first device of the multiple devices in the communication cluster, wherein the first device is an identified one of the multiple devices in the communication cluster that is physically located closest to the user terminal apparatus;

identifying a second device from the rest of the multiple devices;

transmitting, from the first device to the second device, a publication request;

transmitting, from the second device to the first device, a publication reply, wherein the publication reply includes a second set of information, and wherein the second set of information includes a second control instruction relating to a second device identification of the second device and a second device-specific metadata having second user interface information for directly interacting with the second device;

generating, by the first device, consolidated information for the communication cluster, wherein the consolidated information is generated based on a first set of information and the second set of information, and wherein the first set of information includes a first control instruction relating to a first device identification of the first device and a first device-specific metadata having first user interface information for directly interacting with the first device;

storing the consolidated information in the first device;

transmitting, from the first device, the consolidated information to the user terminal apparatus;

enabling a first communication between the first device and the user terminal apparatus based on the consolidated information;

enabling a second communication between the second device and the user terminal apparatus based on the consolidated information;

generating a user interface at the user terminal apparatus based on the consolidated information;

in response to a first user request received via the user interface for performing a first action relating to the first device, implementing the first control instruction so as to directly interact with the first device; and in response to a second user request received via the user interface for performing a second action relating to the second device, implementing the second control instruction so as to directly interact with the second device.

2. The method of claim 1, wherein the first device is coupled to a sensor, and wherein the first set of information includes information for communicating with the sensor.

3. The method of claim 1, wherein the second device is coupled to a sensor, and wherein the second set of information includes information for communicating with the sensor.

4. The method of claim 1, wherein the first user interface information includes one or more first parameters relating to a first user interface of the first device.

5. The method of claim 4, wherein the second user interface information includes one or more second parameters relating to a second user interface of the second device.

6. The method of claim 1, wherein the communication cluster is a first communication cluster, and wherein the consolidated information is first consolidated information, and wherein the method further comprises:
generating second consolidated information for a second communication cluster having a third device and a fourth device, wherein the second consolidated information is generated based on a third set of information and a fourth set of information, and wherein the third set of information includes a third control instruction relating to a third device identification of the third device and a third device-specific metadata having third user interface information for directly interacting with the third device, and wherein the fourth set of information includes a fourth control instruction relating to a fourth device identification of the fourth device and a fourth device-specific metadata having fourth user interface information for directly interacting with the fourth device;
storing the second consolidated information in the third device;
transmitting, via a cloud relay, the second consolidated information to the user terminal apparatus;
updating the user interface at the user terminal apparatus based on the second consolidated information;
in response to a third user request for performing a third action relating to the third device, implementing the third control instruction so as to interact with the third device; and
in response to a fourth user request for performing a fourth action relating to the fourth device, implementing the fourth control instruction so as to interact with the fourth device.

7. The method of claim 6, wherein the third device is coupled to a sensor, and wherein the third set of information includes information for communicating with the sensor.

8. The method of claim 6, wherein the fourth device is coupled to a sensor, and wherein the fourth set of information includes information for communicating with the sensor.

9. The method of claim 1, wherein the consolidated information is provided to an application at the user terminal apparatus and the application generates the user interface.

10. The method of claim 9, wherein the consolidated information is in a form of a HyperText-Markup-Language (HTML) page, and wherein the application includes a web browser.

11. The method of claim 1, further comprising:
monitoring the status of the first device by the user interface at the user terminal apparatus; and
monitoring the status of the second device by the user interface at the user terminal apparatus.

12. The method of claim 1, further comprising:
in an event that an additional device is added to the communication cluster, updating the consolidated information by:
transmitting, from the first device, to the additional device in the communication cluster, an updated publication request;
transmitting, from the additional device to the first device, an updated publication reply, wherein the updated publication reply includes an additional set of information for communicating with the additional device, wherein the additional set of information includes an additional control instruction relating to an additional device identification of the additional device; and
updating the consolidated information by the first device based on the updated publication reply.

13. A method of interacting with devices in a network by a mobile apparatus, the method comprising:
determining the mobile apparatus is within a range of the network utilized by multiple devices in a communication cluster;
enabling a communication between the mobile apparatus and a first device of the multiple devices in the communication cluster, wherein the first device is an identified one of the multiple devices in the communication cluster that is physically located closest to the mobile apparatus;
identifying a rest of the multiple devices;
transmitting, from the first device to each of the rest of the multiple devices, a publication request;
transmitting, from each of the rest of the multiple devices to the first device, a publication reply, wherein the publication reply includes device-specific metadata having individual user interface information and corresponding individual control instruction information for directly interacting a corresponding one of each of the rest of the multiple devices;
generating, by the first device, consolidated information for the communication cluster, wherein the consolidated information is generated based on device-specific metadata having individual user interface information and corresponding individual control instruction information for directly interacting with the first device and the device-specific metadata from each of the rest of the multiple devices;
transmitting, by the first device, the consolidated information to the mobile apparatus;
enabling a direct communication between any one of the multiple devices and the mobile apparatus based on the consolidated information;
generating a user interface at the mobile apparatus based on the consolidated information, wherein the user interface enables a user of the mobile apparatus to directly interact with each of the multiple devices by implementing the corresponding individual control instruction.

14. The method of claim 13, wherein at least one of the multiple devices is coupled to a sensor, and wherein the corresponding individual user interface information includes information for interacting with the sensor.

15. The method of claim 13, wherein the consolidated information is first consolidated information, and wherein the method further comprising:

receiving, via a cloud relay, second consolidated information for multiple devices in a second communication cluster, wherein the second consolidated information is generated based on individual control instructions relating to each of the multiple devices in the second communication cluster and device-specific metadata having user interface information for directly interacting with the each of the multiple devices;

transmitting the second consolidated information to the mobile apparatus; and updating the user interface at the mobile apparatus based on the second consolidated information, wherein the updated user interface enables the user of the mobile apparatus to interact with each of the multiple devices in the second communication cluster by implementing the corresponding individual control instruction.

16. The method of claim 13, wherein the consolidated information is provided to an application at the mobile apparatus and the application generates the user interface.

17. The method of claim 16, wherein the consolidated information is in a form of a HTML page, and wherein the application includes a web browser.

18. The method of claim 13, further comprising monitoring the status of each of the multiple devices by the user interface at the mobile apparatus.

19. The method of claim 13, further comprising updating the consolidated information in an event that an additional device is added to the network.

20. The method of claim 13, further comprising updating the consolidated information in an event that one of the multiple device is removed from the communication cluster.

* * * * *